United States Patent [19]
Shimizu

[11] 3,895,255
[45] July 15, 1975

[54] LIGHT SOURCE DEVICE FOR PHOTOELECTRIC EQUIPMENTS

[75] Inventor: Shinichiro Shimizu, Kumamoto, Japan

[73] Assignee: Nippon Shoji Kaisha, Limited, Osaka, Japan

[22] Filed: Sept. 6, 1973

[21] Appl. No.: 394,654

[30] Foreign Application Priority Data
Jan. 27, 1972  Japan .............................. 47-10114

[52] U.S. Cl. ................ 315/174; 315/176; 315/299; 315/307
[51] Int. Cl. ......................................... H05b 37/00
[58] Field of Search ............ 323/19, 20, 64, 65, 67; 315/174, 175, 176, 299, 307, 308, 311

[56] References Cited
UNITED STATES PATENTS
3,396,326   8/1968   Kisrow .................................. 323/20

Primary Examiner—R. V. Rolinec
Assistant Examiner—Lawrence J. Dahl

[57] ABSTRACT

Light generating apparatus for use with photoelectric equipment which includes a lighting voltage source, a reference frequency generator, a reference signal generator producing a pulsating signal having high and low voltages synchronized with said reference frequency generator, and a comparator for comparing the lighting voltage with the reference voltage to produce a difference signal, the comparator signal being used to control the lighting voltage.

1 Claim, 5 Drawing Figures

3,895,255

LIGHT SOURCE DEVICE FOR PHOTOELECTRIC EQUIPMENTS

This invention relates to an improvement in a light source device used in co-operation with photoelectric equipment in which light from a light source is converted into an electric signal to be amplified and processed. The device of this invention is particularly suitable for use as a light source device for absorbance measurement.

In equipment of the type referred to above the electric signal is conventionally amplified in a form of alternating or pulsating current. One way of providing a current of this form is to convert the light into a d.c. signal and then interrupt it by a chopper. With such an arrangement, however, subsiantial noise may be produced and, moreover, it is difficult to feed back the output of the amplifier to the photoelectric converting device to correct distortion and stabilize the circuit operation. Another procedure is to interrupt the light path by a rotating shutter. As such a device must include mechanically moving components, it may produce undesirable noise and vibration and, in addition, it may be large in size and difficult to handle. A further procedure is to intermittently energize a gas discharge tube by a commercial a.c. supply. However, it is undesirable for absorbance measurement because it produces a light having a rather narrow frequency band width.

Accordingly, an object of this invention is to provide an improved light source device which can produce a light over a wide frequency range from near-ultra violet to near-infra red and also overcome all of the above mentioned problems.

This object can be attained in accordance with this invention by effectively and intermittently energizing an incandescent lamp under a stable luminous intensity condition. The light source device of this invention comprises an incandescent lamp, a voltage source for supplying a predetermined lighting voltage to said lamp, a signal generator for generating a frequency signal, a reference voltage generator for generating an intermittent reference voltage in synchronizm with said frequency signal and a comparator for comparing said lighting voltage with said reference voltage and generating a comparison signal corresponding to the difference therebetween and a voltage control for controlling said lighting voltage in response to said comparison signal wherein said frequency signal has a frequency equal to or less then the reciprocal of the thermal time constant of the incandescent lamp.

Other objects and features of this invention will be described in detail hereinunder with reference to the accompanying drawings.

IN THE DRAWINGS

Figure 1:
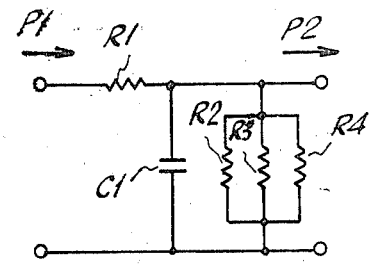
FIG. 1 is a schematic circuit diagram representing an equivalent circuit of an incandescent lamp.

Referring now to FIG. 1, an incandescent lamp can be illustrated as an equivalent circuit consisting of a series of connection of a resistor R1 and a capacitor C1 connected between the input terminals and a parallel connection of three resistors R2, R3 and R4 connected across the capacitor C1. The resistor R1 simulates the electrical resistance of the filament of the incandescent lamp and the capacitor C1 simulates the heat capacity of the filament and its mount. The resistors R2, R3 and R4 simulate respectively thermal resistance of radiation, conduction and convection due to the gas within the lamp. The symbols P1 and P2 indicate the electrical input and optical output energies, respectively. Therefore, it can be seen that an incandescent lamp forms a kind of integration circuit having a thermal time constant which is determined mainly by the values of heat capacity C1 and thermal resistances R2, R3 and R4. Assuming the value of the heat capacity C1 as MC and the composite resistance of the parallel resistances R2, R3 and R4 as R, the thermal time constant should be MC × R. In order to give the maximum amplitude to the pulsating light emitted from the incandescent lamp, the frequency f of the lamp lighting voltage may be selected so as to fulfill an equation:

$$MC \times R \le 1/f \qquad (1)$$

Figure 2:
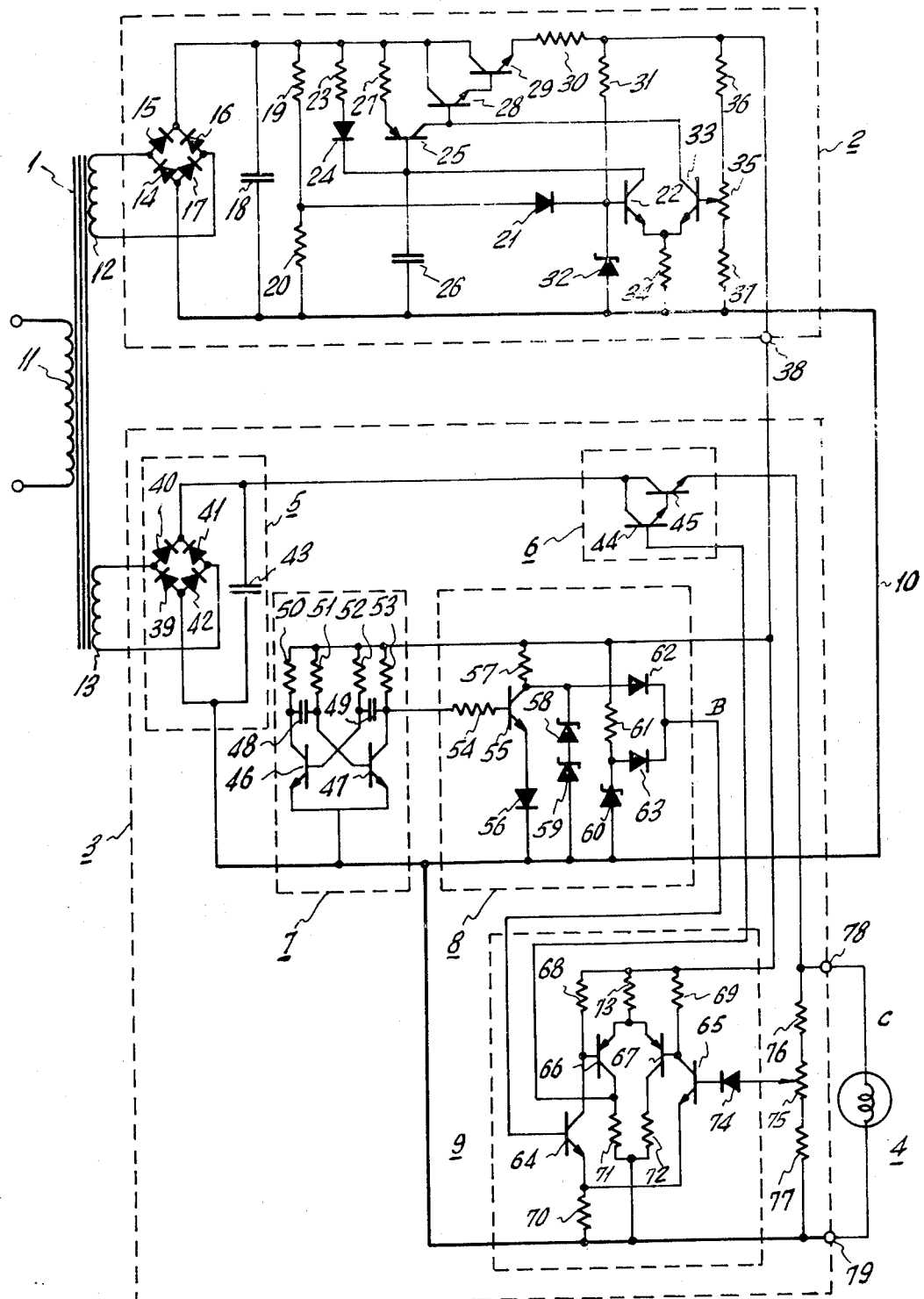
FIG. 2 is a circuit diagram representing an embodiment of the light source device according to this invention.

Referring to FIG. 2, there shown is a circuit which embodies the principle of this invention and includes a transformer 1 having a primary winding 11 and secondary windings 12 and 13, an auxiliary stabilized d.c. voltage source 2 for rectifying the secondary voltage across the secondary winding 12 and producing a stable d.c. voltage of 24 volts for example, a lamp lighting voltage source 3 for generating a pulsating voltage having a frequency given by Equation (1) and an incandescent lamp 4 rated 12 volts and 10 watts for example.

The auxiliary stabilized d.c. voltage source 2 includes a full-wave rectifier consisting of four diodes 14, 15, 16 and 17 and having input terminals connected to the secondary winding 12 of the transformer 1. Between the positive output terminal of the rectifier and the ground line 10, there are connected in parallel a capacitor 18, a series connection of resistors 19 and 20 the junction of which is connected through a diode 21 to the base electrode of a NPN transistor 22, and a series connection of a resistor 23, a diode 24 and a capacitor 26. The junction of the resistor 24 and capacitor 26 is connected to the collector electrode of the transistor 22 and to the base electrode of a PNP transistor 25 whose emitter electrode is connected through a resistor 27 to the rectifier output. The collector electrode of the transistor 25 is connected to the base electrode of a NPN transistor 28 which forms a Darlington connection with a NPN transistor 29, the collector electrode of the both transistors being connected to the rectifier output and the emitter electrode of the transistor 29 being connected through resistors 30 and 31 to the base electrode of the transistor 22 which is also connected through a Zener diode 32 to the ground line 10. The base electrode of the transistor 28 is connected to the collector electrode of a NPN transistor 33 whose emitter electrode is connected with the emitter electrode of the transistor 22 through a resistor 34 to the ground line 10. The base electrode of the transistor 33 is connected to the movable arm of a potentiometer 35 which is connected in series with resistors 36 and 37 between the junction of the resistors 30 and 31, which is connected to an output terminal 38, and the ground line 10.

In operation, the primary winding 11 of the transformer 1 is connected to a commercial a.c. supply and a stabilized d.c. voltage is produced at the output terminal 38. As the circuit configuration of the system is a conventional one and the operation of the circuit is self-evident to those skilled in the art, a further description of the d.c. voltage source 2 will be omitted.

The lamp lighting voltage source 3 comprises a rectifier section 5, a voltage control section 6, a signal generator section 7, a reference voltage generator section 8 and a comparator section 9, which are surrounded respectively by broken lines in the drawing.

The rectifier section 5 includes a full-wave rectifying circuit consisting of four diodes 39, 40, 41 and 42 having input terminals connected to the secondary winding 13 of the transformer 1, and a capacitor 43 connected between the output terminals thereof.

The voltage control section 6 is composed of a Darlington connection of NPN transistors 44 and 45, having a controlled voltage input from the output of the rectifier section 5, a control signal input from the output of the comparator section 9 and a voltage output to the output terminal 78 of the system.

The signal generator section 7 is composed of a conventional astable multivibrator including a pair of NPN transitors 46 and 47, a pair of capacitors 48 and 49 and two pairs of resistors 50, 51, 52 and 53. The operating voltage is supplied from the output terminal 38 of the d.c. source 2 to one end of each of the resistors 50, 51, 52 and 53 and the output signal is derived from the collector electrode of one of the transistors 46 and 47.

The reference voltage generator section 8 comprises an NPN transistor 55 having base electrode connected through a resistor 54 to the output of the signal generator section 7. The collector electrode of the transistor 55 is connected through a resistor 57 to the output terminal 38 of the d.c. source 2 and the emitter electrode is connected through a diode 56 to the ground line 10. A series connection of Zener diodes 58 and 59 is connected between the collector electrode of the transistor 55 and the ground line 10 and a series connection of a resistor 61 and a Zener diode 60 is connected between the output terminal 38 and the ground line 10. The collector electrode of the transistor 55, and the junction of the resistor 61 and Zener diode 60 are respectively connected to the anode electrodes of diodes 62 and 63, and the cathode electrodes of the both diodes are connected together to provide the output of this section 8.

The comparator section 9 includes a pair of NPN transistors 64 and 65 and a pair of PNP transistors 66 and 67. The collector electrodes of the transistors 64 and 65 are connected respectively through resistors 68 and 69 to the output terminal 38 of the d.c. source 2 and the emitter electrodes thereof are connected together through a resistor 70 to the ground line 10. The collector electrodes of the transistors 66 and 67 are connected respectively through resistors 71 and 72 to the ground line 10 and the emitter electrodes thereof are connected together through a resistor 73 to the output terminal 38 of the source 2. The base electrodes of the transistors 66 and 67 are respectively connected to the collector electrodes of the transistors 64 and 65. The compared input is supplied from the movable arm of a potentiometer 75 having its resistance element connected in series with resistors 76 and 77 between the terminals 78 and 79 of the incandescent lamp 4. The movable arm of potentiometer 75 is connected through a diode 74 to the base electrode of the transistor 65 and the reference input is supplied from the output of the reference voltage generator section 8 to the base electrode of the transistor 64. The comparison output is derived from the collector electrode of the transistor 66 and supplied to the base electrode of the transistor 44 of the voltage control section 6.

When the primary winding 11 of the transformer 1 is connected to a commercial a.c. supply a 24 volt d.c. stabilized voltage is produced at the output terminal 38, and is supplied to the signal generator section 7, reference voltage generator section 8 and comparator section 9. Based upon a normal multivibrator action, the signal generator section 7 produces a square wave as shown in FIG. 3(A) at the collector electrode of the transistor 47 and this signal is applied to the base electrode of the transistor 55. The astable multivibrator of the signal generator section 7 is previously adjusted to produce a waveform having a frequency $f$ which fulfills Equation (1), for example 15 Hertz. The transistor 55 of the reference voltage generator section 8 is driven into conduction by the high level of the square wave signal applied to its base electrode and into non-conduction by the low level thereof. It is self-evident that, by the unidirectional action of the diodes 62 and 63, the voltage at the output terminal of the section 8 that is, the junction of the diodes 62 and 63 is made equal to the Zener voltage of the Zener diode 60 during conduction of the transistor 55 and equal to the sum of the Zener voltages of the Zener diodes 58 and 59 during non-conduction of the transistor 55. As the Zener diodes 58, 59 and 60 are selected to have same Zener voltage, 6 volts in this embodiment, the output of the reference voltage generator section 8 has a square waveform alternating between 6 and 12 volt levels at a frequency equal to the output of the signal generator section 7, as shown in FIG. 3(B).

Furthermore, an incandescent lamp lighting voltage is produced by the rectifier section 5 and supplied through the voltage control section 6 to the terminals 78 and 79 of the incandescent lamp 4. A part of this voltage is picked up by the movable arm of the potentiometer 75 which is connected in series with the resistors 76 and 77 between the terminals 78 and 79 and applied through the diode 74 to the base electrode of the transistor 65 in the comparator section 9. The reference voltage waveform B supplied by the reference voltage generator section 8 is fed to the base electrode of the transistor 64. Through a known comparing action of the comparator section 9, a voltage corresponding to the difference between both voltages applied to the transistors 64 and 65 is derived from the collector electrode of the transistor 66 and applied to the base electrode of the transistor 44 in the voltage control section 6. By the use of this difference voltage, the lamp lighting voltage from the rectifier section 5 is provided with a square waveform synchronized with the reference voltage waveform B, as shown in FIG. 3(C). In this embodiment, the low and high levels of the square wave output of the voltage control section 6 are controlled at 8 and 16 volts by adjusting the movable arm of the potentiometer 75. The high level of 16 volts is deemed sufficient for giving enough luminous energy to the spectrum in the range of short wavelengths and, at the low level of 8 volts, the luminous intensity is reduced almost to its minimum value. The low level of the lighting voltage should not be reduced to zero level, in order to avoid transient phenomena such as noise due to switching-off.

Figure 3:
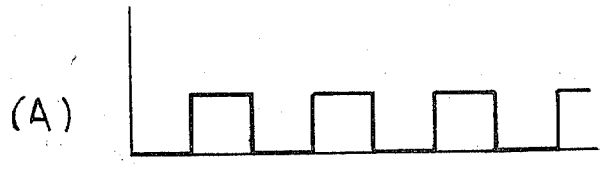
FIG. 3 is a waveform diagram representing signal waveforms appearing at various points in the circuit of FIG. 2.
Figure 3:
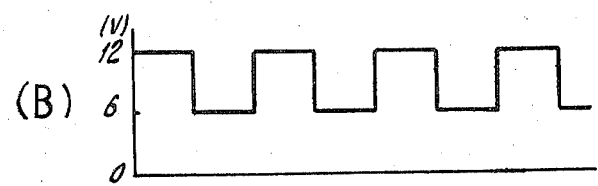
Figure 3:
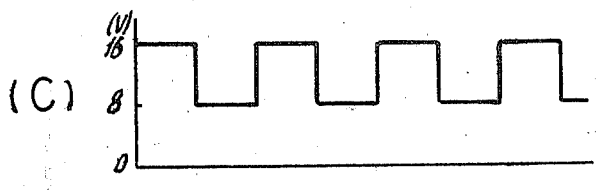
Figure 3:
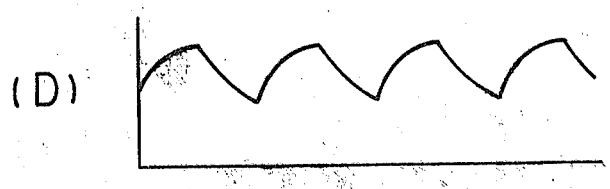

With the lighting voltage generated as the above, the incandescent lamp 4 emits a stable light having a sufficient amplitude of pulsation. The emitted light has a waveform as shown in FIG. 3(D), which is an integration of the waveform C of FIG. 3. This is due to the abovementioned fact that the incandescent lamp 4 forms a kind of integration circuit as shown in FIG. 1.

The frequency $f$ which fulfills Equation (1) and corresponds to the reciprocal of the thermal time constant of the incandescent lamp can be measured, for example, in the following manner.

Figure 4:
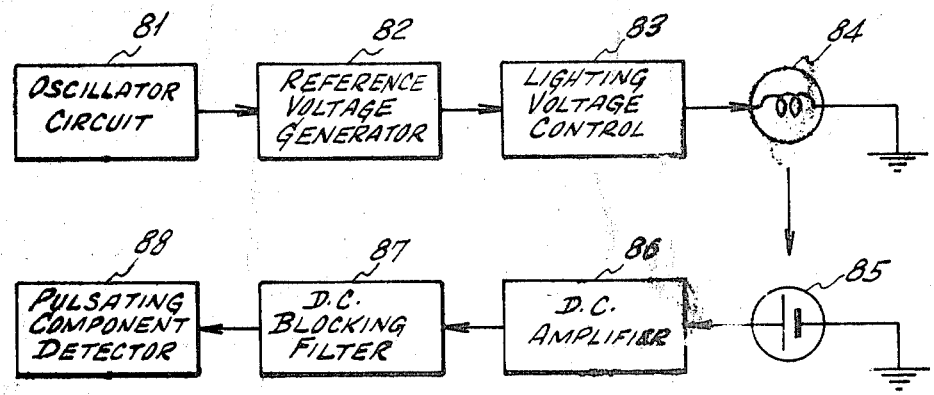
FIG. 4 is a block diagram representing a device used for measuring the thermal time constant of an incandescent lamp.

Referring to FIG. 4, there is shown a device for effecting this measurement, including an oscillator circuit 81, a reference voltage generator 82, a lighting voltage control circuit 83, an incandescent lamp 84, a selenium photocell 85, a d.c. amplifier 86, a d.c. blocking filter 87 and a pulsating component detector 88. The oscillator circuit 81 is composed of a multivibrator and produces a square wave having a frequency adjustable over a range from 1 to 50 Hertz. The reference voltage generator 82 is synchronized with the output of the oscillator 81 and produces a reference square wave having high and low levels at 8 and 4 volts respectively. The lighting voltage control circuit 83 is controlled by the output of the reference voltage generator 82 and produces a square wave synchronized with both outputs of the circuits 81 and 82. The high and low levels of the output waveform of the circuit 83 can be adjusted, keeping the ratio thereof at two (2). The levels are so selected that the rated voltage of the tested incandescent lamp 4 falls between both levels that is, 8 and 4 volts for 6 volt lamp, 16 and 8 volts for 12 volt lamp and 32 and 16 volts for a 24 volt lamp during this measurement. The incandescent lamp 4 is energized intermittently by the output of the circuit 83 and the emitted light is received by the selenium photocell 85 and converted into a pulsating current signal. The output of the cell 85 is amplified by a factor of about 1000 by the d.c. amplifier 86, and the output of the amplifier 86 is filtered by the filter 87 in order to remove the d.c. component therefrom. The remaining pulsating component corresponding to the quantity of pulsating light emitted from the lamp 84 is measured by the detector 88. The measurement is carried out with various frequencies and various lamps.

Figure 5:
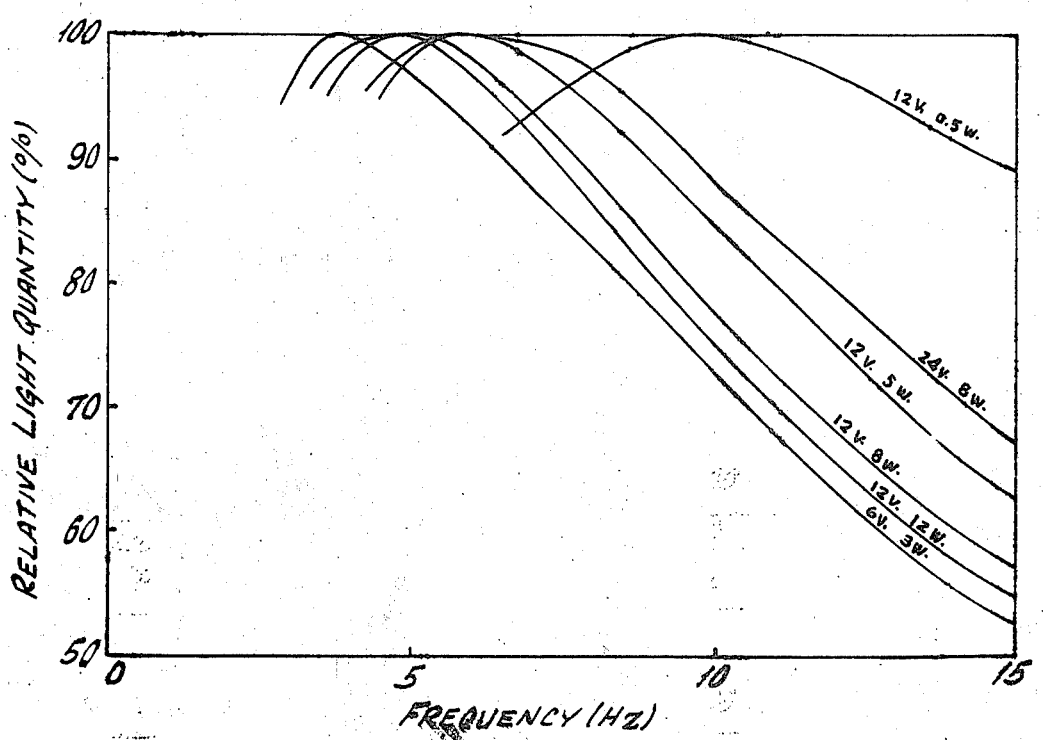
FIG. 5 is a chart which aids in explaining a method of measuring the thermal time constant of an incandescent lamp.

When the measured values are plotted with respect to the frequency of the lighting voltage, the plot exhibits a single peak corresponding to the maximum quantity of light emitted from the lamp tested. The frequency corresponding to this peak is believed to fulfill Equation (1) and to be the reciprocal of the thermal time constant of the lamp in question. FIG. 5 shows such plots obtained from measurements on six kinds of lamps with respect to various frequencies and the light quantity is indicated relative to the peak value. As evident from the figure, the frequency corresponding to the peak varies with the rated value of the lamp. According to the principle of this invention, the incandescent lamp is to be energized with a lighting voltage having a frequency equal to or less than this peak frequency.

As described in the above, the light source device of this invention can emit a light having a sufficient amplitude of pulsation and, therefore, prevent non-linearlity in the input and output of a photoelectric equipment, which may take place when the amplification factor of the amplifier is increased in the case of small amplitude of pulsation of the incident light. As the stability of the emitted light is almost same as that of the electronically controlled, stabilized d.c. source, characteristic and performance of photoelectric equipment can be remarkably improved by using the light source device of this invention. Moreover, the device of this invention is simple in structure and can be made at low cost because it does not use any mechanical components such as a chopper.

What is claimed is:

1. A light source device comprising an incandescent lamp having a thermal time constant, a voltage source for supplying a pulsating lighting voltage to said lamp, said voltage source including a d. c. voltage source having a voltage control interconnected therewith, said d. c. source being connected with said lamp for energization thereof, a reference frequency generator having a frequency not exceeding the reciprocal of said thermal time constant, a reference voltage generator connected with said reference frequency generator and producing an output voltage alternating between two voltage levels at a rate determined by the reference frequency generator, a comparator interconnected with said lamp to sense the voltage applied thereto and interconnected with said output reference voltage, said comparator producing an output control signal related to the difference between the lamp voltage and said output reference voltage and a connection between said comparator and said voltage control for applying a controlled voltage to said lamp varying between two voltage levels at a rate determined by said reference frequency whereby said lamp will produce a pulsating light output that may be sensed by a photoelectric element.

* * * * *